United States Patent [19]

Tedder

[11] Patent Number: 4,576,301

[45] Date of Patent: Mar. 18, 1986

[54] WHEEL PROTECTOR

[76] Inventor: Bob L. Tedder, 18864 Northam, West Covina, Calif. 91792

[21] Appl. No.: 537,680

[22] Filed: Sep. 30, 1983

[51] Int. Cl.<sup>4</sup> ............................................. F16N 31/00
[52] U.S. Cl. .................................. 220/1 C; 184/106; 301/37 R
[58] Field of Search ................. 301/37 R, 37 P, 36 R, 301/38 R, 36 WP; 184/106; 220/1 C, DIG. 13

[56] References Cited

U.S. PATENT DOCUMENTS 572,641  12/1896  Kriner ................................. 184/106
1,231,189  6/1917  Pearson ............................... 184/106

Primary Examiner—David A. Scherbel
Assistant Examiner—Mark J. Abate
Attorney, Agent, or Firm—John H. Lynn

[57] ABSTRACT

A wheel protector is formed as a tray to fit inside a dish-type truck wheel to collect lubricants and other material as an axle is removed from the truck without demounting the wheel from the truck.

4 Claims, 3 Drawing Figures

WHEEL PROTECTOR

BACKGROUND OF THE INVENTION

This invention relates generally to apparatus and methods for protecting wheels during removal and replacement of brakes and wheel bearings and particularly to apparatus and methods for preventing lubricants and other materials from contacting outer surfaces of dish-type wheels which permit removal of an axle from a vehicle without first demounting the wheel from the vehicle.

Dish-type wheels used in dual wheel configurations are typically comprised of a generally cylindrical rim upon which a tire is mounted and a disk fastened to one end of the rim. The disk extends outwardly along the cylindrical axis so that a pair of wheels may be fastened together at a hub to form a dual wheel configuration. Typically, the dish of the inner wheel faces inwardly toward the vehicle to enclose the hub assembly and the dish of the outer wheel faces outwardly so that the disks of the wheels may be mounted adjacent one another on the hub assembly. The axle extends outwardly from the juncture of the wheel disks into the dish of the outer wheel. Each dish, therefore, has a central opening for accommodating the axle and, in addition, has a plurality of openings to permit the use of lug bolts and nuts to fasten the wheels to the hub. The wheels for a large truck or trailer may typically have openings for ten lug bolts.

Wheels of this type are designed so that the axle may be removed from vehicle without the wheels being first demounted from the hub. The axles are removed to lubricate or replace wheel bearings and to perform other maintenance procedures, such as inspection and replacement of brake drums. First, the axle is removed through the central opening and then the rims, wheels and hub and drum assembly are all removed at the same time since they are fastened together by the lug bolts and lub nuts. This procedure is used for maintenance work on truck wheel bearings and brakes because of the large amount of time required to remove and re-install the wheels, which may be attached by ten lug bolts and corresponding lug nuts. Even though this procedure provides a significant time saving over a procedure which would involve first removing the wheels from the hub before removing the axle, ordinarily removing the axle while the wheels are attached to the hub causes a large amount of lubricant from the wheel bearings to fall upon the lower portions of the dish of the outer wheel. To avoid an unsightly appearance and to avoid the possible hazards and inconveniences associated with having wheel bearing lubricant on the outer portions of the wheels, it is necessary to clean the lubricant from the wheels before the vehicle may be placed in service after completion of the maintenance procedure. The usual procedure for removing the wheel lubricant from the outer portions of the wheels is steam cleaning, which requires one to two hours for a complete truck, depending upon the number of axles on the truck and the amount of lubricant which must be removed from the wheels.

SUMMARY OF THE INVENTION

The present invention provides a device which permits removal of a truck axle with the wheels still attached to the hub without encountering the problem of having wheel bearing lubricant and other undesirable materials come into contact with the outer surfaces of the wheels. The invention is a pan or tray-like device formed as an arc to fit within the circular wheel dish. The tray is formed to have a cross-section which conforms to that of the wheel dish in order to retain the tray within the dish. The tray fills approximately one fourth of the dish to provide adequate area for receiving material which may fall from the axle or axle opening as the axle is removed from the hub assembly. As the axle is being removed from the hub assembly, the wheel bearings may be collected in the tray, which may then be removed from the dish to carry the bearings to a cleaning station. The bearings may be cleaned and inspected and re-installed or replaced as a appropriate. The tray should be placed in the dish of the wheel before the axle and bearings are installed.

DESCRIPTION OF THE PREFERRED EMBODIMENT

Figure 1:
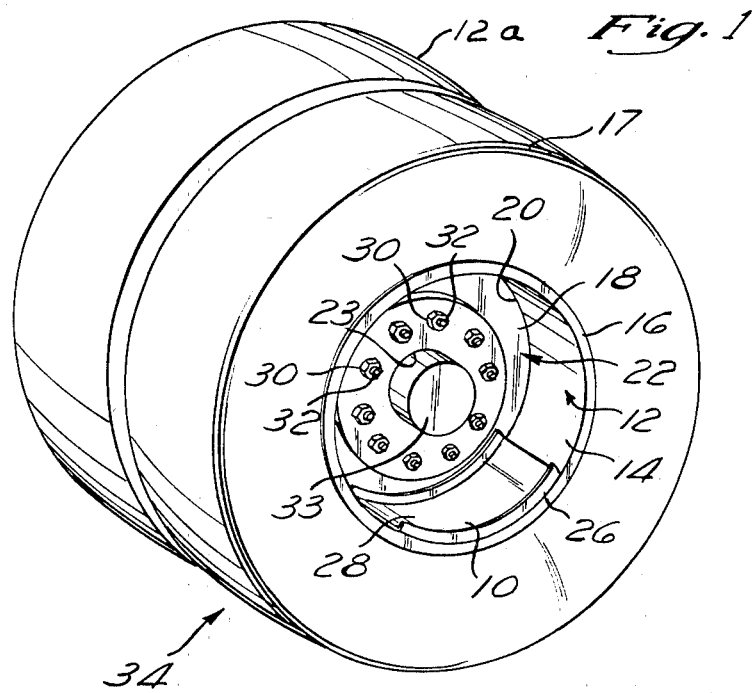
FIG. 1 is a perspective view illustrating the use of the invention to shield a wheel as an axle is removed from a hub assembly to which the wheel is attached as a part of a dual wheel assembly.
Figure 2:
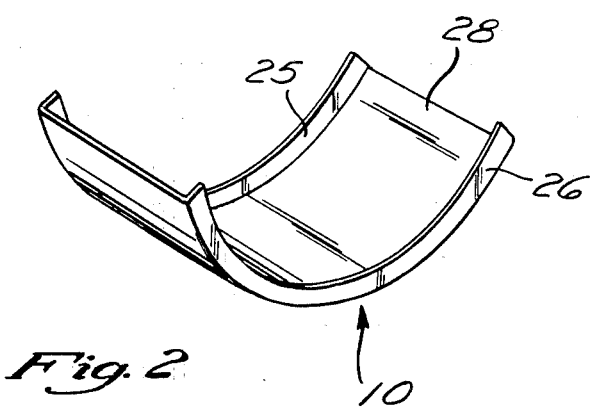
FIG. 2 is a perspective view of a first embodiment of the invention.

FIG. 2 illustrates the basic structure of a wheel protector tray 10 according to the invention. The wheel protector tray 10 is formed for placement inside a dish-shaped truck wheel 12 as shown in FIG. 1. The embodiment of the wheel protector tray 10 shown in FIGS. 1 and 2 is designed specifically for use with a wheel 12 having a rim 14 for mounting tube-type tires. The rim 14 is typically a generally circular cylindrical configuration having flanges 16 at the ends thereof for engaging the bead of a tire 17 to retain the tire 17 upon the wheel 12. A structure known in the art as a disk 18 is mounted to one end 20 of the cylindrical rim 14 to substantially enclose the end 20 and form a dish 22. The disk 18 extends axially outward from the cylindrical rim 14 a distance sufficient to permit the disk 18 to be mounted to a hub (not shown) without interfering with rotation of the wheel 12 and tire 17 attached thereto. A pair of such wheels 12 are typically mounted together with the disks 18 facing one another and attached to the hub by a plurality of lug nuts 30 and lug bolts 32 to form a dual wheel assembly 34.

The dual wheel assembly 34 is typically mounted so that the dish 22 of the inner wheel 12A encloses the hub and a brake drum assembly (not shown). An axle 33 extends through a central opening 23 in the disk 18 into the dish 22 of the outer wheel 12.

The wheel protector tray 10 is preferably molded from fiberglass or a suitable plastic material using a mold formed of a material such as plaster. An actual wheel of the type and dimensions for which the tray is intended is preferably used to form the plaster mold. Such molding procedures are well known in the art and are therefore not explained in detail herein. The wheel protector tray 10 of the invention, being ordinarily formed from a plaster mold formed using an actual wheel, is slightly larger in radius than the interior of the disk 22. The wheel protector tray 10 covers approximately one-fourth of the rim 14 and is somewhat flexible so that the tray 10 easily fits within the disk 22 as shown in FIG. 1. Truck wheels presently are manufactured in standard sizes having diameters ranging from 15 inches to 24.5 inches. The wheel protector tray may be made to be sufficiently flexible so that a tray designed for a particular wheel may be used with a somewhat smaller wheel. A tray designed for a particular wheel may be also used with a larger wheel; however, best results are obtained when the tray size and rim size correspond.

The wheel protector tray includes an inner lip portion 25 and an outer lip portion 26 that extend away from a bottom portion 28 which conforms to the shape of the wheel 12. In particular, the bottom portion 28 has a first curved cross section having approximately the same radius of curvature as the dish 22 and a second cross section that conforms to the cross section of the rim 14 between the outer flange 16. For a tube-type rim, the tray has a bottom 28 that is formed substantially as a segment of a right circular cylinder. The inner lip 25 is placed adjacent the disk 18 and the outer lip 26 extends slightly beyond the flange 16.

The wheel protector tray 10 of the invention is used in maintenance procedures by first placing the tray 10 inside the dish 22 of the outer wheel 12 directly below the axle 33. The axle 33 is pulled from the vehicle with appropriate axle-pulling equipment (not shown). While the axle 33 is being removed, the wheel bearings (not shown) may be collected in the wheel protector tray 10 which has been previously positioned within the dish 22 of the outer wheel 12. Typically, removal of the axle 33 causes a substantial quantity of wheel bearing lubricant to fall from the axle opening into the tray 10. The wheel protector tray 10 catches the wheel bearing lubricant to prevent contact thereof with the surfaces of the wheel dish 22.

After the axle 33 and wheel bearings have been removed from the hub, the wheel protector tray 10 may be removed from the dish 22 to carry the wheel bearings contained therein to a cleaning station (not shown) where they may be cleaned, inspected, and appropriately discarded or prepared for re-installation in the hub assembly. The wheel protector tray 10 should be re-installed in the dish 22 of the outer wheel 12 before re-installation of the axle 33 and wheel bearings.

Figure 3:
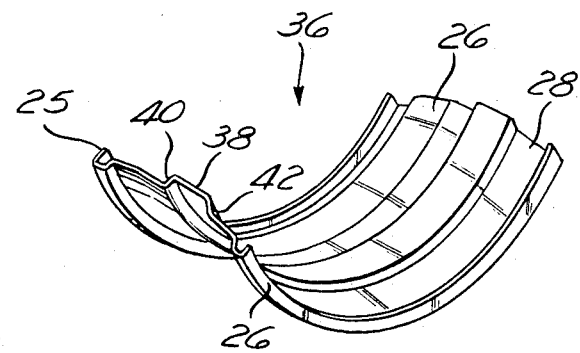
FIG. 3 is a perspective view of a second embodiment of the invention.

FIG. 3 illustrates a wheel protector tray 36 for use with standard wheels designed for tubeless tires (not shown). The rim for a tubeless tire is not cylindrical as is the rim 14 designed for use with a tube tire. Rims (not shown) for tubeles tires have what is known in the art as a center drop. The center drop is a generally cylindrical ring portion of lesser diameter than the portion of the rim adjacent the flanges 16. The center drop is connected to the portion of the rim adjacent the flange by transition portions which for typical wheels make an angle of about 15 degrees with respect to a radius of the wheel 12. The tray 36 is formed to have the same configuration as a portion of a rim designed for tubeless tires. The bottom 28 of the tray 36 includes a projecting ring 38, shown in FIG. 3, that corresponds to the center drop. A pair of transition portions 40 and 42 connect the ring 38 to the bottom 28. Therefore, the tray 36 has a cross-section having a portion formed as an inverted truncated "V" to conform to the shape of the tubeless-type rim. The wheel protector tray 36 for use with a tubeless type rim is formed and used in a manner similar to the tray 10 for use with tube-type rims.

Although the present invention has been described with reference to particular preferred embodiments thereof, it will be understood by those skilled in the art that numerous modifications may be made without departing from the spirit of the present invention. Accordingly, all modifications and equivalents which are properly within the scope of the appended claims are included in the present invention.

What is claimed is:

1. A wheel protector tray for shielding a dish-type wheel of a vehicle from contact with lubricants and other material during removal and replacement of an axle of the vehicle through a central opening in the wheel, comprising:
   a tray formed to fit inside the dish-shaped portion of the wheel, said tray including a bottom portion, said tray having an inner lip portion and an outer lip portion extending away from said bottom portion and cooperating therewith to form a container for placement in the dish-shaped portion of the wheel below an axle to which the wheel is mounted for receiving lubricants and objects as the axle is removed from the vehicle to prevent such lubricants and objects from contacting the outer surface of the wheel.

2. The wheel protector of claim 1 wherein said bottom portion comprises a segment of a cylinder to form a tray for use with a standard wheel having a substantially cylindrical rim configuration for use with tube-type tires.

3. The wheel protector of claim 1 wherein said bottom portion includes a central section having a cross section formed as a truncated "V" to conform to a center drop portion in a rim designed for use with tubeless tires.

4. A method for shielding a dish-type wheel of a vehicle from contact with lubricants and other substances during removal and replacement of an axle through a central opening in the wheel, comprising the steps of:
   forming a tray configured to fit within the dish portion of the wheel;
   placing the tray in the dish portion of the wheel below the axle;
   removing the axle from the vehicle; and
   collecting lubricants and wheel bearings associated with the axle in the tray as the axle is removed from the vehicle.

* * * * *